US008610710B2

United States Patent
Lim et al.

(10) Patent No.: US 8,610,710 B2
(45) Date of Patent: Dec. 17, 2013

(54) METHOD FOR AUTOMATIC RIGGING AND SHAPE SURFACE TRANSFER OF 3D STANDARD MESH MODEL BASED ON MUSCLE AND NURBS BY USING PARAMETRIC CONTROL

(75) Inventors: Seong Jae Lim, Gwangju (KR); Ho Won Kim, Daejeon (KR); Han Byul Joo, Daejeon (KR); Bon Ki Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 460 days.

(21) Appl. No.: 12/970,008

(22) Filed: Dec. 16, 2010

(65) Prior Publication Data

US 2011/0148865 A1    Jun. 23, 2011

(30) Foreign Application Priority Data

Dec. 18, 2009  (KR) .................. 10-2009-0127369
Jun. 3, 2010   (KR) .................. 10-2010-0052390

(51) Int. Cl.
    *G06T 15/00*   (2011.01)
(52) U.S. Cl.
    USPC ........................... 345/419; 345/424
(58) Field of Classification Search
    USPC .................................. 345/419, 424
    See application file for complete search history.

(56) References Cited

U.S. PATENT DOCUMENTS

2009/0213138 A1   8/2009  DeRose et al.

OTHER PUBLICATIONS

Baran, Ilya and Popovic, Jovan, "Automatic Rigging and Animation of 3D Characters", ACM Trans. On Graphics vol. 26(3), pp. 1-8, 2007.

*Primary Examiner* — Maurice L McDowell, Jr.
(74) *Attorney, Agent, or Firm* — Kile Park Reed & Houtteman PLLC

(57) ABSTRACT

Provided is a method for automatic rigging and shape surface transfer of a 3-D standard mesh model based on muscles and Nurbs by using parametric control. In some embodiments, the method includes: extracting a joint-skeleton structure from scan data of dynamic objects having a skeleton structure, or input 3-D mesh models, generating a muscle and an appearance surface based on anatomy information, and generating a standard mesh model that approximates the appearance of the dynamic objects by using the joint-skeleton structure and the generated muscle and appearance surface; and performing the shape surface transfer of the standard mesh model by comparing multi-view image information of the dynamic objects with projection image information of the standard mesh model.

14 Claims, 5 Drawing Sheets

METHOD FOR AUTOMATIC RIGGING AND SHAPE SURFACE TRANSFER OF 3D STANDARD MESH MODEL BASED ON MUSCLE AND NURBS BY USING PARAMETRIC CONTROL

CROSS-REFERENCE TO RELATED APPLICATIONS

This application claims priority under 35 U.S.C. §119 to Korean Patent Application No. 10-2009-0127369, filed on Dec. 18, 2009, and Korean Patent Application No. 10-2010-0052390, filed on Jun. 3, 2010, in the Korean Intellectual Property Office, the disclosure of which is incorporated herein by reference in its entirety.

BACKGROUND OF THE INVENTION

1. Field of the Invention

The present invention relates to a technology capable of transferring a joint structure and a muscle structure of a standard mesh model in order to represent dynamic objects with a 3-D mesh model whose shape can be freely transformed and that can be animated, by using multi-view image information input through a plurality of cameras surrounding dynamic objects having a skeleton structure, and the standard mesh model.

2. Description of the Related Art

As typical related arts capturing appearance information of dynamic objects, there are a method of generating a 3-D model by scanning static appearance information of objects by using an active sensor such as laser or pattern light, and a method of generating a 3-D model by using image information input through various cameras. However, since the appearance of the 3-D models is generated as a volume model whose shape cannot be transformed or is unnatural and is not realistic, there is a disadvantage in that it should be manipulated by skilled specialists.

In the object model generating method of the related art, there is a stick model obtained by modeling an initial skeleton, a surface model representing the appearance of objects with surface patches, a volume model configured of a combination of a sphere, a cylinder, an ellipsoid, and so on. However, there are problems in that the models do not realistically represent the appearance of the objects, the transformation of their shapes corresponding to a motion is unnatural, and they should be manipulated by skilled specialists in order to transform their shapes.

In order to solve these problems in the related art, a method has been proposed of transferring and reusing previous frames or geometrically similar mesh regions in different models. However, the method partially transfers the appearance of the 3-D model, but does not transfer the skeleton structure, such that there is a problem in that a designer should generate the skeleton structure in order to animate the 3-D model. Further, another method has been proposed of transferring the skeleton structure of the standard model to a target model, but the method has a disadvantage in that the target model should have the same mesh model as the standard model.

SUMMARY OF THE INVENTION

The present invention proposes to represent dynamic objects having a skeleton structure with a 3-D mesh model whose shape can be freely transformed and that can be animated by using a standard mesh model. It is an object of the present invention to provide a method for generating a realistic unique mesh model by reflecting muscle characteristics and appearance characteristics in order to realistically represent unique appearance characteristics included in dynamic objects and an automatic rigging and transferring method capable of naturally and realistically implementing motion of a skeleton structure of dynamic objects by transferring a standard mesh model having a hierarchical joint structure.

In order to achieve the above objects, according to an aspect of the present invention, there is provided a method for automatic rigging and shape surface transfer of a 3-D standard mesh model based on muscle and Nurbs by using parametric control including: extracting a joint-skeleton structure from scan data of dynamic objects having a skeleton structure or input 3-D mesh models, generating a muscle and a appearance surface based on anatomy information, and generating a standard mesh model that approximates the appearance of the models by using the joint-skeleton structure and the generated muscle and appearance surface; and performing the transfer of the standard mesh model by comparing the multi-view image information of the dynamic objects with the projection image information of the approximated standard mesh model.

The present invention provides the method for automatic rigging and shape surface transfer of 3-D standard mesh model based on muscle and Nurbs by using parametric control, thereby making it possible to automatically generate the unique mesh model that can freely and realistically transform the appearance of the dynamic objects and can animate them by using the multi-view image information including only the appearance information of the dynamic objects.

DETAILED DESCRIPTION OF THE PREFERRED EMBODIMENTS

Figure 1:
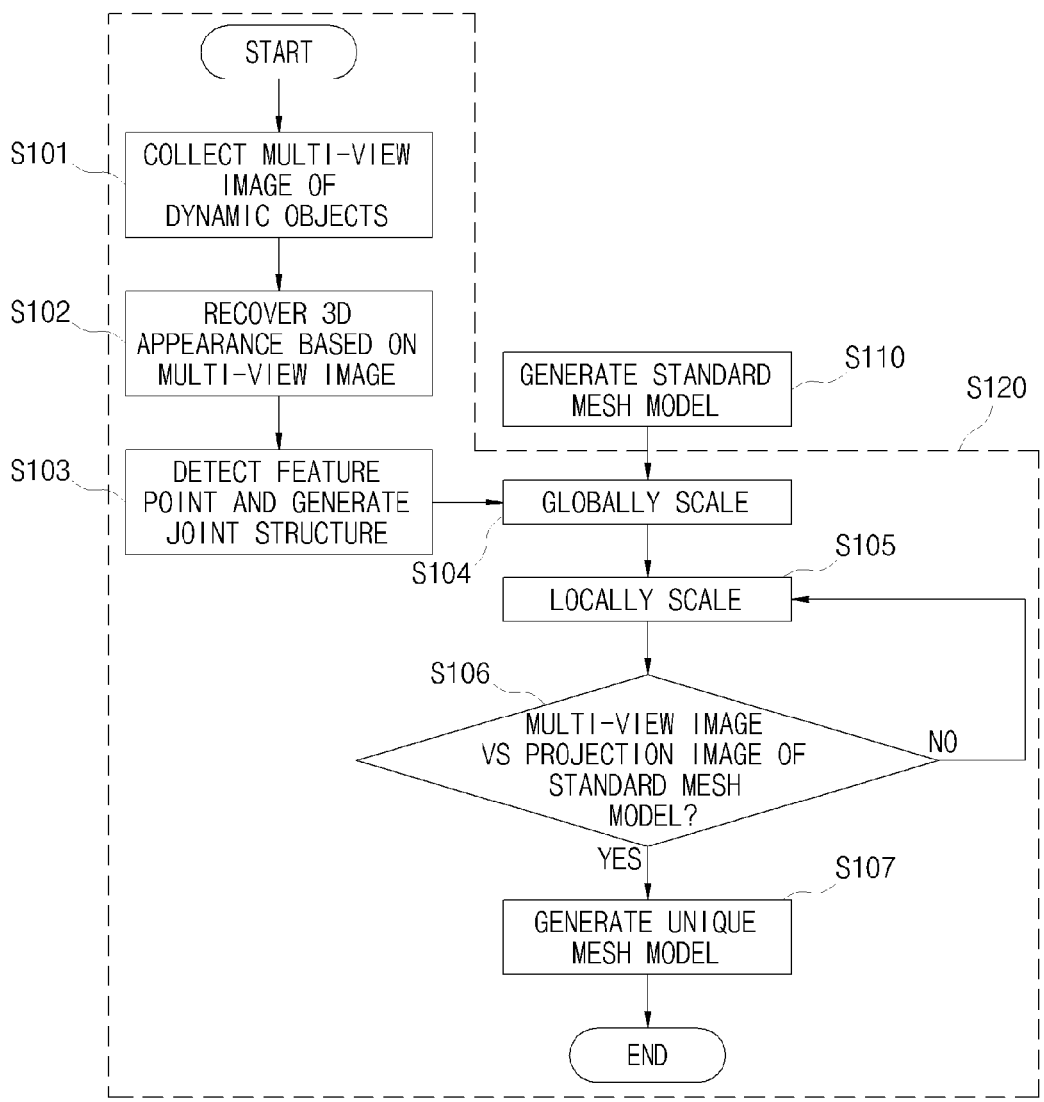
FIG. 1 is a flow chart showing a method for automatic rigging and shape surface transfer of a 3-D standard mesh model based on muscles and Nurbs by using parametric control according to an exemplary embodiment of the present invention.

Advantages and features of the present invention and methods to achieve them will be elucidated from exemplary embodiments described below in detail with reference to the accompanying drawings. However, the present invention is not limited to exemplary embodiment disclosed herein but will be implemented in various forms. The exemplary embodiments are provided by way of example only so that a person of ordinary skilled in the art can fully understand the disclosures of the present invention and the scope of the present invention. Therefore, the present invention will be defined only by the scope of the appended claims. Meanwhile, terms used in the present invention are to explain exemplary embodiments rather than limiting the present invention. Unless explicitly described to the contrary, a singular form includes a plural form in the present specification.

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. Further, in describing the present invention, well-known functions or constructions will not be described in detail since they may unnecessarily obscure the understanding of the present invention.

A method for automatic rigging and shape surface transfer of a 3-D standard mesh model based on muscles and Nurbs by using parametric control according to an exemplary embodiment of the present invention will be described with reference to FIG. 1. FIG. 1 is a flow chart showing a method for automatic rigging and shape surface transfer of the 3-D standard mesh model based on muscles and Nurbs by using parametric control according to an exemplary embodiment of the present invention. The flow chart shown in FIG. 1 is shown by way of example only. Therefore, the present invention is not limited to a time-series sequence shown in FIG. 1.

First, it extracts a joint-skeleton structure from scan data of dynamic objects having a skeleton structure, or input 3-D mesh models, generates a muscle and a appearance surface based on anatomy information, and generates a standard mesh model that approximates the appearance of the models by using the joint-skeleton structure. A method for generating a standard mesh model will be described below with reference to FIGS. 2 and 3.

Next, it performs the transfer of the standard mesh model by comparing the multi-view image information of the dynamic objects with the projection image information of the approximated standard mesh model (S120).

In detail, in order to generate the unique mesh model of the objects, it collects the multi-view image information of the dynamic objects on the appearance and motion of one frame of the dynamic objects by using a multi-view camera (S101). Herein, the multi-view image information of the dynamic objects may include the geometrical shape information of the dynamic objects as well as the color information on the surface of the dynamic objects. First, in order to maximally capture the unique shape information of the dynamic objects by using the camera, the plurality of cameras are disposed around the dynamic objects and each camera stares at the dynamic objects.

Next, it divides a portion corresponding to the dynamic objects region in each image of the multi-view image into a foreground and recovers the geometrical shape of the 3-D appearance based on a volume using a voxel by using the foreground region information of each camera and the color information in the foreground (S102). Herein, the recovered surface voxels have possibility values for the photo-consistency of the multi-view input images and in particular, the voxels that have the degraded photo-consistency due to the position of the multi-view camera and the pose of the dynamic objects have low possibility values. Then, it extracts the connection points for each object portion, the vertices for each object portion, the feature points for each object portion, etc., based on the color and silhouette information extracted from the given multi-view image information and the voxel information having high photo-consistency of the recovered surface voxels and detects the 3-D feature points corresponding to the feature points extracted from the multi-view image information in the recovered volume model. In addition, it generates a cross section based on a normal vector of the surface voxels having the high photo-consistency possibility value of the main portions of the volume model, generates the skeleton structure by connecting the central points of the cross sections of each portion, and generates the hierarchical joint structure, which maintains the hierarchical skeleton structure of the standard mesh model, in the volume model by using the joint position and direction information based on the skeleton information, the feature information of the main object portion, and the metrology information of the standard mesh model (S103).

Next, it automatically rigs the joint of the standard mesh model to the joint of the volume model by adjusting the position and direction parameters of the joint on the input standard mesh model corresponding to each joint on the joint-skeleton structure of the volume model in order to conform the joint structures to each other. It performs the global joint unit scaling on the standard mesh model by adjusting each joint of the standard mesh model and the position parameter determining the size and appearance of the muscle positioned between the joints, and the position and direction parameter of the key cross sections of the appearance surface, according to the length difference ratio between the joints that are generated by the automatic rigging results (S104). At this time, the joint-skeleton structure of the recovered volume model reflects the characteristics of the hierarchical joint-skeleton structure of the standard mesh model, and the size of the standard mesh model approximates the size of the dynamic objects due to the sequential scaling of the entire joint.

Figure 5:
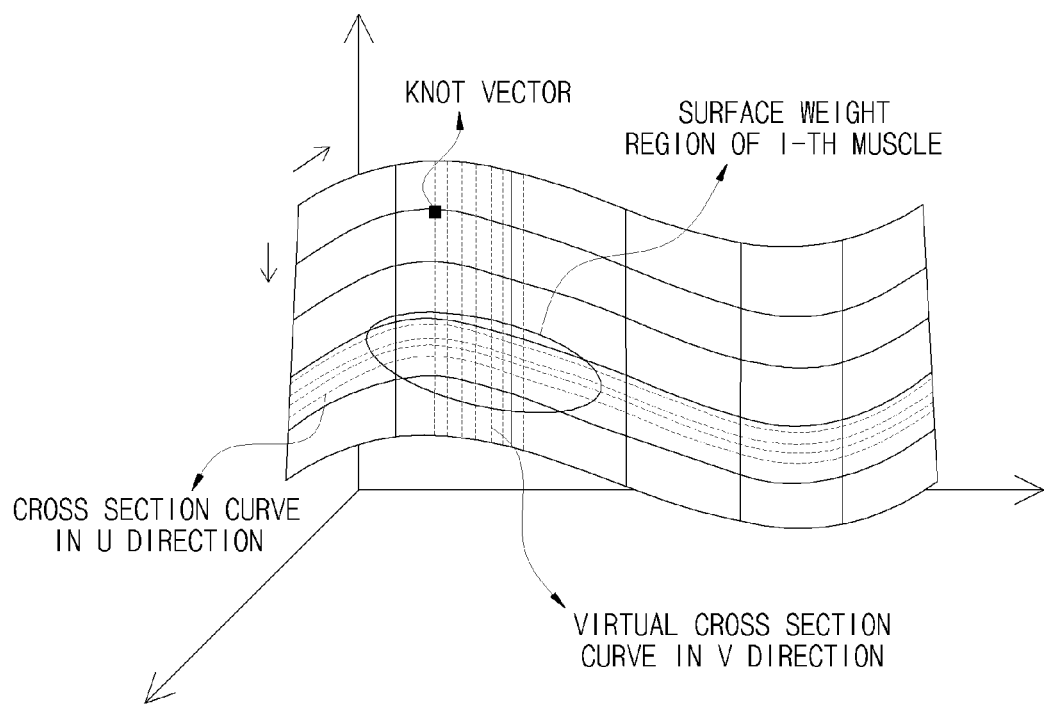
FIG. 5 is a diagram for explaining an effect of applying parameters of a muscle surface to knot vectors detected along a virtual Nurbs curve of u and v axes of the appearance surface.

Next, it reflects the local characteristics of the dynamic objects through the local scaling for each body portion between the joints of the standard mesh model (S105). In detail, the muscle surface connected between the joints is transformed by adjusting the height parameter of the muscle surface of the standard mesh model in order to reflect the position, direction, and size characteristics of the volume model while maintaining the muscle transformation characteristics of the standard mesh model and the appearance surface connected to the muscle surface is transformed by a weighted sum of the knot vector parameters on the virtual Nurbs curve and the weighted sum of the key cross section radius parameter, the displacement parameter, and the control point parameter of the key cross section as shown in FIG. 5. Herein, the virtual Nurb curve is generated in the corresponding region of the appearance surface that has an effect on i-th muscle by the surface weight for the appearance surface of the muscle surface.

In addition, the appearance surface that does not have the muscle is transformed by the weighted sum of the radius parameter of the key cross section configuring the appearance surface and the displacement parameter of the skin vertex. The appearance of the finally transferred mesh model is represented by the following Equation.

$$\text{shape} = \omega_{uslce}(\omega_1 \times m_1 + \omega_2 \times m_2 + \ldots \omega_n \times m_n) + \omega_{sweep} \times r + \omega_{displacement} \times d$$

It controls the knot vectors distributed along the virtual Nurbs curve of two axes orthogonal to each other that reflects the radius parameter determining the heights for each portion along two axes orthogonal to each other of the appearance surface, the height values of the knot vectors of the muscle surface, and the surface weight of the appearance surface while maximally securing the rigidity of the displacement between the appearance surface and the vertex of the standard mesh model representing the characteristics for each portion of the dynamic objects at the portion having the muscle by comparing the occupying error between the finally input multi-view image information and the image information projecting the transformed standard mesh model in order to approximate the occupying error, correct the detailed appearance error, and repeatedly perform the local scaling step until the appearance error is in the predetermined allowable error (S106), thereby finally forming the unique mesh model (S107).

The unique mesh model generated by the above-mentioned method recalculates the muscle parameter by controlling the joint, approximates the parameters of the appearance surfaces connected to each muscle surface by using the weights, and is generated based on the muscle and the appearance surface in order to represent in detail each portion of the dynamic objects, such that it can solve the problem of generating the skin weight for each object with the existing muscle model, the phenomenon of the interpolation, etc., between the portion not having the muscle which cannot be represented by the muscle model and the muscle, the problem of slow transformation due to the calculation complexity of the muscle model, etc.

Figure 2:
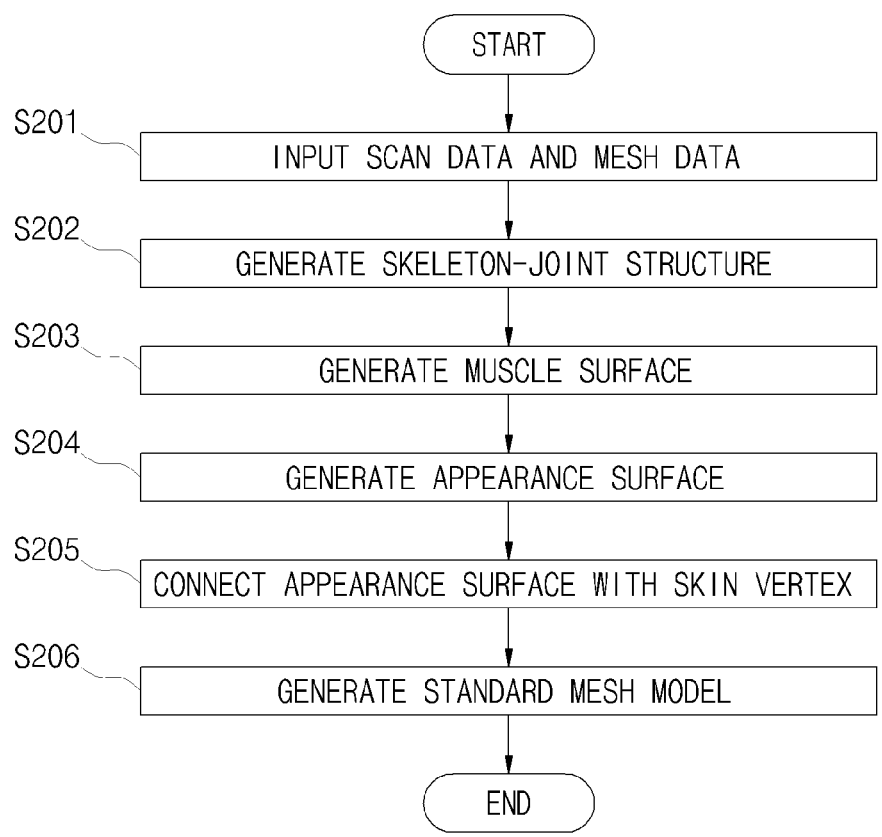
FIG. 2 is a flow chart showing a method for generating a standard mesh model configuring the method for automatic rigging and shape surface transfer of the 3-D standard mesh model based on muscles and Nurbs by using parametric control according to an exemplary embodiment of the present invention.
Figure 3:
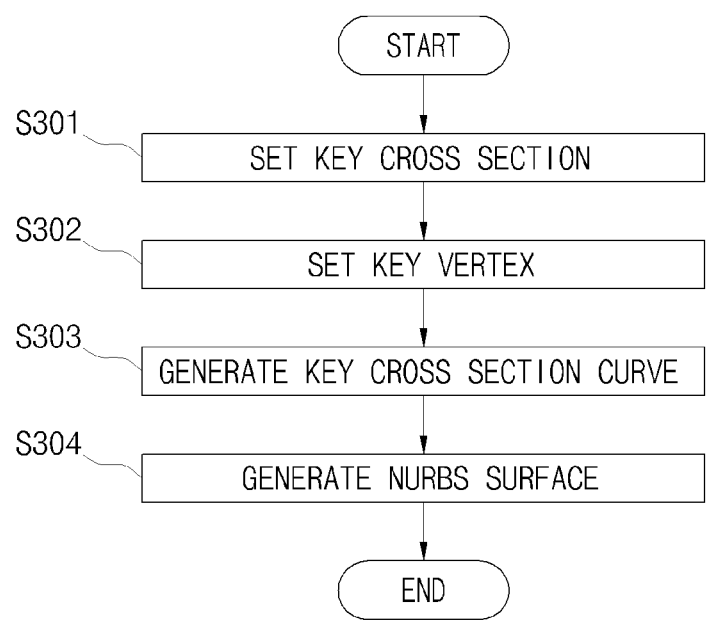
FIG. 3 is a flow chart for explaining a method for generating an appearance surface of a standard mesh model configuring the present invention.
Figure 4:
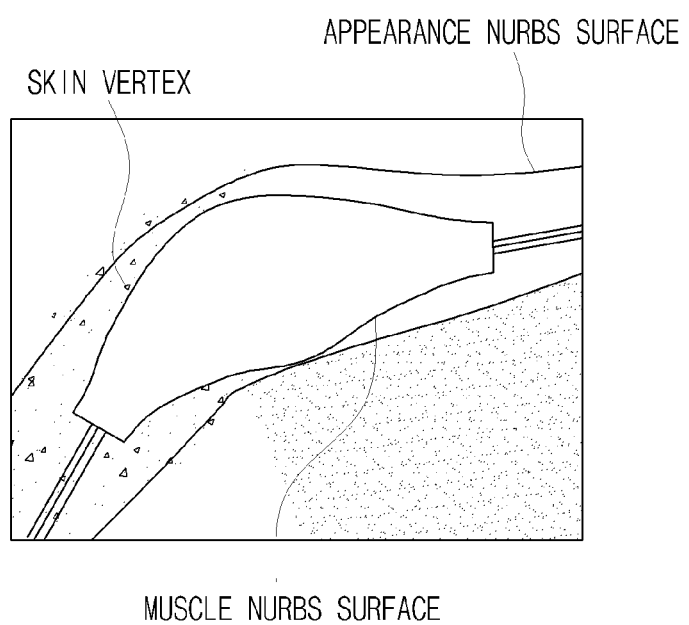
FIG. 4 is a diagram for explaining a muscle, a appearance surface, and a skin vertex configuring the method for automatic rigging and shape surface transfer of the 3-D standard mesh model based on muscles and Nurbs by using parametric control according to an exemplary embodiment of the present invention.

A method for generating a standard mesh model configuring the method for automatic rigging and shape surface transfer of 3-D standard mesh model based on muscles and Nurbs by using parametric control according to an exemplary embodiment of the present invention will be described with reference to FIGS. 2 to 4. FIG. 2 is a flow chart showing a method for generating a standard mesh model configuring the method for automatic rigging and shape surface transfer of 3-D standard mesh model based on muscles and Nurbs by using parametric control according to an exemplary embodiment of the present invention, FIG. 3 is a flow chart for explaining a method for generating a appearance surface of a standard mesh model configuring the present invention, and FIG. 4 is a diagram for explaining a muscle, a appearance surface, and a skin vertex configuring the method for automatic rigging and shape surface transfer of 3-D standard mesh model based on muscle and Nurbs by using parametric control according to an exemplary embodiment of the present invention.

First, it generates the joint-skeleton structure in the given scan data or the input 3-D mesh model (S201, S202). In detail, the spine of the body is a root and the main connection portions for each object portion (for example, shoulder, wrist, pelvis, ankle portions) are sub-roots, such that the hierarchical joint structure having a total of n joints are generated. Then, it generates the Nurbs-based muscle surface consisting of the knot vector and the control point between the joints generated for each object portion based on the anatomy information of the object portions to represent the muscle characteristics of the object portion (S203), sets the key cross section reflecting the characteristics of the muscle surface at the position that can represent the appearance of the dynamic objects well (S301), calculates the central position at the set of the skin vertices of the mesh model existing on the set key cross section and sets the key vertices existing at a predetermined interval from the central position (S302), interpolates the key vertices with the B-spline to generate the key cross section curve (S303), and interpolates the key cross section curve based on two axes orthogonal to each other that is generated along the joint parameter and the skin vertex intersecting with the key cross section to generate the non-uniform rational B-spline (Nurbs) surface (S304), thereby generating the appearance surface (S204).

Next, it sets a dependent relationship between the generated Nurbs appearance surface and the displacement of each vertices of the input mesh model (S205). Herein, the dependent relationship means the connection between the appearance surface and the muscle surface by performing a weighted sum of the knot vector parameter of the muscle surface and the knot vector parameter of the appearance surface by using the surface weight realistically reflecting the transformed degree of the muscle surface. In detail, the knot parameter of the muscle surface is a height parameter and the knot vector parameter of the appearance surface is the displacement of the key vertices positioned on the appearance surface.

Finally, it connects the skin vertex of the input mesh model with the appearance surface (S205) and finally generates the standard mesh model (S206). This means the connection of the skin vertices of the input mesh model, corresponding to the displacement of the vertices of the appearance surface changing according to the parameter of the appearance surface. Finally, the muscle surface, the appearance surface, and the skin vertex of the generated standard mesh model are shown in FIG. 4.

The standard mesh model based on the generated muscles and appearance Nurbs surface performs the natural and realistic appearance transformation of the model by the u direction curve generated by performing the B-spline interpolation on the key vertices corresponding to each key cross section curve with the Edit-Point the uv-map generated in a v direction of the weighted sum between the height parameters of the knot vectors of the muscle surfaces for each object portion at the time of the specific pose such as folding, expansion, protrusion, etc., as shown in FIG. 5.

While certain embodiments have been described above, it will be understood to those skilled in the art that the embodiments described can be modified into various forms without changing technical spirits or essential features. Accordingly, the embodiments described herein are provided by way of example only and should not be construed as being limited. Rather, the apparatus described herein should only be limited in light of the claims that follow when taken in conjunction with the above description and accompanying drawings.

What is claimed is:

1. A method for automatic rigging and shape surface transfer of a 3-D standard mesh model based on muscles and Nurbs by using parametric control, comprising:
    extracting a joint-skeleton structure from scan data of dynamic objects having a skeleton structure, or input 3-D mesh models, generating a muscle and an appearance surface based on anatomy information, and generating a standard mesh model that approximates the appearance of the dynamic objects by using the joint-skeleton structure and the generated muscle and appearance surface; and
    performing the shape surface transfer of the standard mesh model by comparing multi-view image information of the dynamic objects with projection image information of the standard mesh model.

2. The method for automatic rigging and shape surface transfer of 3-D standard mesh model based on muscles and Nurbs by using parametric control according to claim 1, wherein the generating the standard mesh model comprises:
    extracting the joint-skeleton structure from the scan data of the dynamic objects;
    dividing the dynamic objects into object portions based on a joint extracted from the joint-skeleton structure;

generating the muscle surface based on the anatomy information for each of the object portions;

generating the appearance surface that is subjected to the parametric control corresponding to a change in the muscle surface by using a direction parameter of the joint;

defining a parametric correlation between the muscle surface and the appearance surface to transfer the appearance surface corresponding to the change in the muscle surface; and connecting a skin vertex with the appearance surface.

3. The method for automatic rigging and shape surface transfer of 3-D standard mesh model based on muscles and Nurbs by using parametric control according to claim 2, wherein the generating the appearance surface comprises:

setting a key cross section reflecting characteristics of the muscle surface;

calculating a central position of a set of skin vertices of the mesh model existing on the set key cross section and setting key vertices existing at a predetermined interval from the central position;

interpolating the key vertices with a B-spline to generate a key cross section curve; and interpolating the key cross section curve based on two axes orthogonal to each other that is generated along a joint parameter and the skin vertex intersecting with the key cross section to generate a non-uniform rational B-spline (Nurbs) surface.

4. The method for automatic rigging and shape surface transfer of a 3-D standard mesh model based on muscles and Nurbs by using parametric control according to claim 2, wherein the defining the parametric correlation between the muscle surface and the appearance surface connects between the appearance surface and the muscle surface by performing a weighed sum of a knot vector parameter of the muscle surface and a knot vector parameter of the appearance surface by using a surface weight realistically reflecting a transformed degree of the muscle surface.

5. The method for automatic rigging and shape surface transfer of 3-D standard mesh model based on muscles and Nurbs by using parametric control according to claim 4, wherein the knot vector parameter of the muscle surface is a height parameter and the knot vector parameter of the appearance surface is a displacement of key vertices positioned on the appearance surface.

6. The method for automatic rigging and shape surface transfer of a 3-D standard mesh model based on muscles and Nurbs by using parametric control according to claim 2, wherein the connecting the skin vertex with the appearance surface connects skin vertices corresponding to a displacement of vertices of the appearance surface changing according to a parameter of the appearance surface.

7. The method for automatic rigging and shape surface transfer of a 3-D standard mesh model based on muscles and Nurbs by using parametric control according to claim 1, wherein the performing the shape surface transfer of the standard mesh model comprises:

detecting feature points of main portions determining an appearance and motion of the dynamic objects from a volume (voxel) model recovered based on the multi-view image information;

generating a skeleton structure in the volume model and generating a joint-skeleton structure of the volume model by using feature point information and metrology information of the joint-skeleton structure of the standard mesh model;

approximating the standard mesh model to the volume model by the automatic rigging that conforms a joint position and direction of the standard mesh model to a joint structure of a volume structure, the joint-skeleton structure of the standard mesh model, a global scaling of a key cross section curve of the muscle surface and the appearance surface; and generating a unique mesh model by transferring the standard mesh model to the volume model by using a local scaling.

8. The method for automatic rigging and shape surface transfer of 3-D standard mesh model based on muscles and Nurbs by using parametric control according to claim 7, wherein the detecting the feature points extracts connection points, vertices, and the feature points for each object portion based on color and silhouette information extracted from the multi-view image information and detects 3-D feature points corresponding to the feature points in the volume model recovered based on the multi-view image information.

9. The method for automatic rigging and shape surface transfer of 3-D standard mesh model based on muscles and Nurbs by using parametric control according to claim 7, wherein the generating the joint-skeleton structure in the volume model comprises:

generating a cross section based on a normal vector of surface voxels of the volume model;

generating the skeleton structure in the volume model by connecting central points of the cross section; and generating a joint by using the skeleton structure, the feature point information, and the joint position and direction information of the standard mesh model.

10. The method for automatic rigging and shape surface transfer of 3-D standard mesh model based on muscles and Nurbs by using parametric control according to claim 7, wherein the approximating the standard mesh model to the volume model by using the global scaling comprises:

automatically rigging a joint of the standard mesh model to a joint of the volume model by adjusting position and direction parameters of the joint on the standard mesh model corresponding to the joint of the volume model; and performing a joint unit scaling on the standard mesh model by using a joint parameter, a muscle surface parameter, and a key cross section parameter of the appearance surface of the standard mesh model according to a length difference ratio between the joints that are generated by the automatic rigging results.

11. The method for automatic rigging and shape surface transfer of 3-D standard mesh model based on muscles and Nurbs by using parametric control according to claim 7, wherein the generating the unique mesh model by using the local scaling comprises:

adjusting a parameter of the muscle surface of the standard mesh model in order to reflect position, direction, and size characteristics of the volume model;

transforming the appearance surface connected to the muscle surface of the standard mesh model corresponding to an adjusted muscle surface; and transforming the appearance surface by using a displacement parameter of a skin vertex.

12. The method for automatic rigging and shape surface transfer of a 3-D standard mesh model based on muscles and Nurbs by using parametric control according to claim 11, wherein the transforming the appearance surface corresponding to the adjusted muscle surface transforms the appearance surface by reflecting a weighted sum of a key cross section radius parameter of the appearance surface, a knot parameter on a virtual Nurbs curve, and a control point parameter.

13. The method for automatic rigging and shape surface transfer of a 3-D standard mesh model based on muscles and Nurbs by using parametric control according to claim 11, wherein the transforming the appearance surface by using the displacement parameter of the skin vertex uses a weighted sum between a key cross section radius parameter of the standard mesh model and the displacement parameter of the skin vertex.

14. The method for automatic rigging and shape surface transfer of a 3-D standard mesh model based on muscles and Nurbs by using parametric control according to claim 7, wherein the transferring the standard mesh model further comprises determining whether an occupying error between the multi-view image information of the dynamic objects and the projection image information of the standard mesh model is in a predetermined allowable error range.

\* \* \* \* \*